April 16, 1963 J. S. COOK ETAL 3,086,176

NOISE ELIMINATION SYSTEM FOR PARAMETRIC AMPLIFIERS

Filed Nov. 19, 1959

INVENTORS J. S. COOK
W. H. LOUISELL
BY David P. Kelley
ATTORNEY

United States Patent Office 3,086,176
Patented Apr. 16, 1963

3,086,176
NOISE ELIMINATION SYSTEM FOR PARAMETRIC AMPLIFIERS

John S. Cook, New Providence, and William H. Louisell, Summit, N.J., assignors to Bell Telephone Laboratories, Incorporated, New York, N.Y., a corporation of New York
Filed Nov. 19, 1959, Ser. No. 854,076
4 Claims. (Cl. 330—4.7)

Figure 1:
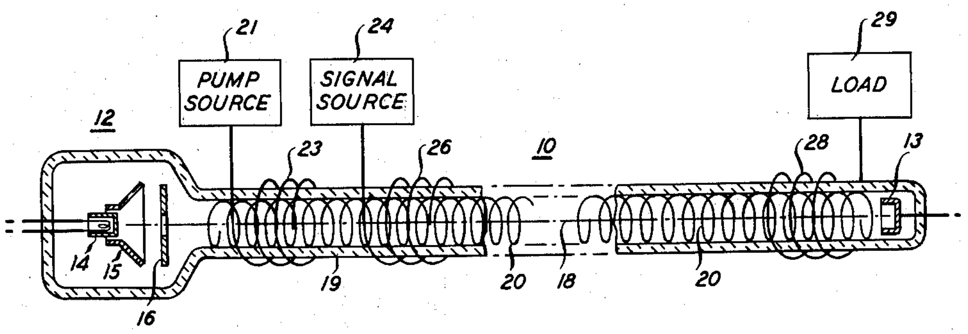

This invention relates to electron discharge devices and more particularly to such devices of the parametric amplifier type.

Of the many advances made in the microwave art in recent years, one of the most important is the discovery that the principles of parametric amplification can be used to attain many desirable results. The term "parametric amplifier" in general refers to a family of electrical devices in which amplification is achieved through the periodic variation of a circuit parameter. As applied to high frequency electron discharge devices the term generally refers to a device in which a signal wave is used to modulate an electron beam, the signal modulations being subsequently amplified through periodic variations of certain beam or circuit parameters by the use of a "pump" frequency.

One type of electron discharge tube parametric amplifier is described in the application for patent of C. F. Quate Serial No. 698,854, filed November 25, 1957, and which is now U.S. Patent 2,974,252, granted March 7, 1961. Because the device disclosed in the Quate application effects amplification through principles which are completely different from those of prior devices such as the conventional traveling wave tube, many of the inherent deficiencies of these devices are avoided. In the conventional traveling wave tube, for example, amplification can only take place through signal wave interaction with space charge waves propagating in the slow mode of the beam, whereas gain in the parametric amplifier may be produced through interaction with fast mode space charge waves. This is significant in that slow mode energy is at a lower level than the D.-C. kinetic energy of the beam, while energy propagating in the fast mode represents energy in excess of the D.-C. kinetic energy of the beam. As a result, substantially all of the inherent beam noise within a predetermined bandwidth can be removed from the fast space charge waves whereas such removal is quite difficult, if not impossible, when coupling takes place in the slow mode.

Although the Quate device, by operating in the fast mode, is capable of producing relatively low noise amplification, a completely noiseless amplifier of this type has not yet been realized. This is due to various second order effects some of which have been isolated and others of which are still under study. For example, it is very difficult to "strip" completely all of the deleterious fast mode noise power from the beam. For reasons of compactness and economy, it is usually desirable to combine the input section and the noise stripping apparatus into a single unit. However, when this is done, no provision is made for removing "input" noise which is introduced on the beam at the input section by cross coupling. Further, the mixing of pump and signal waves generates an "idler" wave of a frequency equal to the difference of frequencies of the pump and signal waves. Noise existing at this idler frequency must be stripped from the beam since the idler wave also couples with the signal wave. Therefore, the band of noise frequencies which must be stripped from the beam is often so wide as to require a plurality of stripping devices, thereby further complicating tube structure.

There is disclosed in the application of Cook et al.,

Serial No. 854,073, filed November 19, 1959, a beam type parametric amplifier which obviates the necessity of noise stripping apparatus. Rather than inducing a single growing wave as in prior art parametric amplifiers, the Cook et al. device provides two growing waves through parametric amplification. This is accomplished by transmitting the signal wave along a slow wave structure in coupling relationship to the fast mode of the beam. Various parameters of the slow wave structure are adjusted to fulfill certain predetermined conditions with respect to certain beam parameters. Under these conditions the two growing waves are made to "beat" together in such a way that noise energy and signal energy are alternately transferred between the beam and the slow wave structure. At some predetermined distance along the tube signal energy exists substantially completely on the slow wave circuit while noise energy within the signal frequency bandwidth exists substantially completely on the beam. At this point the signal wave is removed from the slow wave circuit with substantially no noise within the signal bandwidth included therewith.

In certain instances of operation, however, desired performance of both the Quate and Cook et al. devices are impaired somewhat by the presence on the beam of certain upper sideband frequency waves. As is described in the patent of Ashkin et al., 2,958,001, granted October 25, 1960, these higher frequencies couple to the signal wave and may thereby introduce a significant quantity of spurious noise thereto. This noise therefore may appear at the output as part of the signal wave. The Ashkin patent offers a solution to this problem through the use of an auxiliary slow wave structure in the amplification region of the tube to prevent coupling of the upper sideband frequency waves to the signal wave. Of course, the use of an addiitonal slow wave structure complicates tube manufacture and adds to the weight and expense of the device. Another solution to the upper sideband frequency problem is the use of cyclotron wave interaction rather than space charge wave interaction. At present, cyclotron wave devices appear to have certain power and frequency limitations and therefore are not desirable for all applications.

Accordingly, it is an object of this invention to eliminate the effects of noise power existing on the electron beam of a beam-type parametric amplifier.

It is another object of this invention to obviate the necessity of noise stripping apparatus in a beam-type parametric amplifier.

It is a specific object of this invention to obviate the necessity of any auxiliary structures or special methods of operation for the purpose of eliminating the effects of upper sideband frequency noise in a beam-type parametric amplifier.

These and other objects of the present invention are attained in one illustrative embodiment thereof which comprises an electron discharge device having an evacuated envelope with an electron gun therein for forming and projecting an electron beam along an extended path. A slow wave circuit such as a helix is positioned along the path of flow for propagating signal energy in an interacting relationship with a fast space charge mode of the beam. The slow wave circuit also serves to modulate the electron beam with pump energy which is at a higher frequency than the signal frequency. As the signal energy is transferred from the slow wave circuit to the beam, it mixes with the pump energy and becomes parametrically amplified.

The mixing of the pump and signal waves results in two growing coupled waves. As pointed out in the aforementioned Cook et al. application, if, under proper conditions, two such waves grow at the same rate and propagate at different velocities, they will interfere with each other in such a way as to set up standing waves along the amplification region. In the Cook et al. device, this results in a periodic transfer with respect to distance of signal energy and noise energy within the signal bandwidth between the slow wave structure and the beam. Considering the periodic transfers of the signal and noise waves as being standing waves along the path of flow, the standing wave representing signal energy transfer is 180 degrees out-of-phase with respect to the standing wave representing the noise energy. The signal wave can thereby be removed from the slow wave structure at a point at which the noise energy is substantially completely on the beam. Noise energy originally existing at the upper sideband frequencies, however, may couple to the signal wave and thereby appear at the output as part of the signal wave. In accordance with one aspect of this invention, noise energy originating at the upper sideband frequencies, as well as noise within the signal frequency bandwidth, is periodically transferred between the beam and the helix 180 degrees out-of-phase with respect to similar periodic transfer of signal wave energy.

If one disregards slow mode propagation, an electron beam can be considered as being the equivalent of a transmission line. When waves on two dispersive transmission lines couple together, the coupled wave travels at a faster or slower phase velocity than the phase velocity of either of the uncoupled waves propagating independently. This is due to the additive or substractive effect of mutual inductance or capacitance. The faster of these two possible phase velocities results from in-phase coupling and is referred to as the in-phase normal mode. The slower mode is manifested by opposite polarities on corresponding points of the two lines at a given instant and is referred to as the out-of-phase normal mode. When the pump or signal wave on the slow wave circuit of the present device couples to the beam, two normal modes are produced as previously described. When the term "uncoupled velocity" is used, it is intended to refer to the phase velocity at which a particular wave would travel on a given transmission line if that line was uncoupled.

It is a feature of this invention that the following phase velocities be substantially the same: the uncoupled phase velocity of the signal wave on the slow wave circuit; the uncoupled phase velocity of the signal wave on the beam; and the in-phase normal mode of the coupled pump wave.

Figure 2:
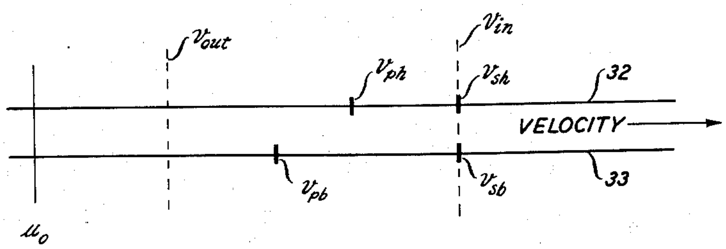

This and other features of this invention will be understood more fully from the following detailed description, taken in conjunction with the accompanying drawing, in which:

FIG. 1 is a schematic view of one illustrative embodiment of this invention; and FIG. 2 is a graph illustrating the phase velocities of various waves which propagate within the device shown in FIG. 1.

Referring now to the drawing, the specific illustrative embodiment depicted in FIG. 1 comprises a traveling wave tube 10 having an electron gun 12 and collector 13 at opposite ends thereof. For purposes of illustration, electron gun 12 is shown as comprising a cathode 14, a beam forming electrode 15, and an accelerating electrode 16, which jointly coact to form and project an electron beam, schematically shown at 18, toward the collector 13. These elements are maintained in a vacuum by means of an envelope 19. Suitable means for foscusing the beam are used. Such focusing means are well known in the art and are not shown for purposes of simplicity. Likewise, the voltage sources for maintaining the proper potentials on the various electrodes have not been shown.

Extending along tube 10 is a conductive helix 20. A pump wave from pump source 21 is coupled to helix 20 by a coupling helix 23 and a signal wave from source 24 is likewise coupled to helix 20 by coupling helix 26. These two waves are propagated in interacting relationship with the fast space charge mode of beam 18. The mixing of the pump and signal waves on the beam results in parametric amplification of the signal wave as will be explained presently. Located at an appropriate distance along helix 20 is a coupling helix 28. Coupling helix 28 is designed to be synchronous with the signal wave so that the amplified signal energy is thereby extracted from helix 20 and transmitted to an appropriate load 29.

The mixing of the pump and signal waves on beam 18 produces growing waves in the manner described in the aforementioned Cook et al. application. These two waves travel at different phase velocities but grow at the same rate. This being so, the two waves interfere with each, or "beat" together to create a standing wave along the amplification region. Due to this interference, signal energy on helix 20 is transferred entirely to the beam, and farther downstream it is transferred back to the helix, growing exponentially with distance. On the other hand, fast mode noise on the beam transfers periodically between the beam and the helix, also growing exponentially.

This process is fully explained in the aforementioned Cook et al. application and therefore will not be discussed in detail. Suffice it to say that the periodic transfer of beam noise energy within the signal bandwidth is 180 degrees out-of-phase with respect to the corresponding transfer of signal energy. At the position of the output coupling helix 28 substantially all of the signal energy is on the helix 20 and is removed while leaving substantially all of the beam noise energy on the beam. The present device, however, differs from the Cook et al. device in that noise power originating at the upper sideband frequencies, as well as noise power within the signal bandwidth, exists substantially completely on the beam at the position at which the signal wave is removed from helix 20.

The reason that the periodic transferal of upper sideband noise is 180 degrees out-of-phase with respect to the corresponding transferal of signal wave energy is the unique way in which two growing waves are produced in the amplification region. This, in turn, is a result of the particular propagation characteristics of the helix 20 with respect to the propagation characteristics of the beam. More specifically, we have found that noise originating at the upper sideband frequencies, as well as noise within the signal bandwidth, will periodically transfer between the beam and the helix 180 degrees out-of-phase with respect to a corresponding transfer of signal energy if the following phase velocities are equal: the velocity of the uncoupled signal wave on the helix; the velocity of the uncoupled signal wave on the beam; and the velocity of the in-phase normal mode created by the coupling of the helix pump wave to the beam.

These conditions are illustrated graphically in FIG. 2. Graph 32 illustrates the spectrum of phase velocities of waves which may propagate along helix 20, while graph 33 illustrates a similar spectrum with reference to beam 18. Both graphs are one-dimensional and show increases of phase velocity from left to right as indicated by the arrow labelled "velocity." The D.-C. velocity $u_o$ of the beam is used as a reference for both graphs because all fast mode space charge waves propagate at a faster velocity than $u_o$. The uncoupled phase velocity of the pump wave on the helix is shown by $v_{ph}$, the subscript $h$ being included to indicate helix propagation. The velocity at which the pump wave would travel if it propagated independently of the helix on beam 18 is given by $v_{pb}$. When the helix couples to the beam at the pump frequency, in-phase and out-of-phase normal modes result. The line labelled $v_{in}$ represents the velocity of propagation of the coupled pump wave when the coupling is in-phase, while $v_{out}$ represents the velocity of propagation of the out-of-phase normal mode.

The relative propagation characteristics of the beam and helix are chosen such that the in-phase normal mode velocity $v_{in}$ is substantially equal to the uncoupled phase velocity $v_{sb}$ of the signal wave on the beam. The helix characteristics are also designed such that both of these velocities are substantially equal to the uncoupled phase velocity $v_{sh}$ of the signal wave on the helix.

Besides the conditions governing the phase velocities of the various waves on the system, the Cook et al. application teaches other conditions which must be met for optimum operation. Likewise, these conditions must be met in the present device. One of these conditions is:

$$\frac{\omega_s}{\omega_i}=\left(\frac{C_i}{C_s}\right)\left[\frac{(QC)_s}{(QC)_i}\right]^{1/4} \qquad (1)$$

where $\omega_{s,i}$ is the frequency, respectively, of the signal and idler waves, $C_{s,i}$ as the gain parameter, respectively, at the signal and idler frequencies, and $(QC)_{s,i}$ is the space charge parameter at these two respective frequencies.

The other condition is:

$$\left(\frac{m}{4}\right)^2\frac{\omega_i(\alpha_s\alpha_i+\alpha_s\alpha_p+\alpha_i\alpha_p)^2}{\omega_s\alpha_s\alpha_i}<\frac{C_s^2}{4\sqrt{(QC)_s}} \qquad (2)$$

where $m$ is the fraction of beam current modulation at the pump frequency and $\alpha_{(p,s,i)}$ is the beam velocity parameter at the pump, signal and idler frequencies, respectively. The beam velocity parameters are ascertained by:

$$\alpha_{(p,s,i)}=\frac{\omega_{q\,(p,s,i)}}{\omega_{(p,s,i)}} \qquad (3)$$

where $\omega_q$ is the reduced plasma frequency. An explanation of the term "reduced plasma frequency" as well as a physical illustration of the beam velocity parameters are given in the aforementioned Cook et al. application.

The distance along helix 20 between the signal wave input helix 26 and the signal wave output helix 28 is given by:

$$L=\frac{1}{2\sqrt{\frac{(\kappa_s)^2}{(\alpha_s)}-\frac{M}{4}}} \qquad (4)$$

where L is measured in reduced plasma wavelengths at the signal frequency. $\kappa_s$ is given by:

$$\kappa_s=\frac{\alpha_s}{4(QC)_s^{3/4}} \qquad (5)$$

M is given by:

$$M=\frac{m^2}{16}\left(\frac{\alpha_i\omega_i}{\alpha_s\omega_s}\right)\left(1+\frac{\alpha_p}{\alpha_s}+\frac{\alpha_p}{\alpha_i}\right)^2 \qquad (6)$$

It is to be understood that the above-described arrangements are merely illustrative of the principles of the present invention. For example, any of various well-known slow wave structures could be used in place of the helix 20. Various other arrangements may be devised by those skilled in the art without departing from the spirit and scope of this invention.

What is claimed is:

1. An electron discharge device comprising a coupled transmission system, said system comprising a cathode for forming an electron beam, means for projecting said beam along an extended path and an elongated slow wave circuit in coupling relationship to said beam, a source of signal frequency wave energy, a source of pump wave energy of a higher frequency than said signal frequency, said sources being coupled to an input end of said slow wave circuit, a load device coupled to an output end of said circuit, said slow wave circuit comprising means for propagating said signal energy and said pump energy in coupling relationship with the fast space-charge mode of said electron beam whereby said signal energy and said pump energy are allowed to mix, said mixing being characterized by the formation of a fast space-charge idler wave, said coupled system being characterized by the following relationships:

$$v_{in}=v_{sb}=v_{sh}$$

$$\frac{\omega_s}{\omega_i}=\frac{C_i}{C_s}\left(\frac{(QC)_s}{(QC)_i}\right)^{1/4}$$

$$\left(\frac{m}{4}\right)^2\frac{\omega_i(\alpha_s\alpha_i+\alpha_s\alpha_p+\alpha_i\alpha_p)^2}{\omega_s\alpha_s\alpha_i}<\frac{C_s^2}{4\sqrt{(QC)_s}}$$

where $v_{in}$ is the phase velocity of the in-phase normal mode of the coupled pump wave, $v_{sb}$ is the uncoupled phase velocity of the signal wave on the beam, $v_{sh}$ is the uncoupled phase velocity of the signal wave on the helix, $\omega_s$ is the signal frequency, $\omega_i$ is the idler frequency, $C_i$ is the gain parameter at the idler frequency, $C_s$ is the gain parameter at the signal frequency, $(QC)_s$ is the space-charge parameter at the signal frequency, $(QC)_i$ is the space-charge parameter at the idler frequency, $\alpha_s$ is the beam velocity parameter at the signal frequency, $\alpha_i$ is the beam velocity parameter at the idler frequency, $\alpha_p$ is the beam velocity parameter at the pump frequency, and $m$ is the fraction of beam modulation at the pump frequency.

2. The electron discharge device of claim 1, wherein said beam is characterized by a particular reduced plasma wavelength at the signal frequency, and wherein the length of the slow wave structure is substantially given by:

$$L=\frac{1}{2\sqrt{\frac{(\kappa_s)^2}{(\alpha_s)}-\frac{M}{2}}}$$

where L is measured in reduced plasma wavelengths at the signal frequency, $\kappa$ is given by:

$$\kappa_s=\frac{\alpha_s}{4(QC)_s^{3/4}}$$

and M is given by:

$$M=\frac{m^2}{16}\left(\frac{\alpha_i\omega_i}{\alpha_s\omega_s}\right)\left(1+\frac{\alpha_p}{\alpha_s}+\frac{\alpha_p}{\alpha_i}\right)^2$$

3. An electron discharge device comprising means for forming and projecting a beam of electrons having fast and slow modes of propagation, a source of signal frequency waves, a source of pump frequency waves, and transmitting means for propagating said signal and pump waves in coupling relationship with the fast mode of said beam, said transmitting means being so designed that an uncoupled electromagnetic wave at the signal frequency travels thereon at a first predetermined velocity, said beam being so designed that an uncoupled space charge wave in the fast mode at the signal frequency travels thereon at a second predetermined velocity, the coupling between said beam and said transmitting means at said pump frequency giving rise to in-phase and out-of-phase normal modes of propagation of said coupled pump wave, said in-phase normal mode propagating along the beam and helix at a third velocity of propagation, and said first, second and third velocities being substantially equal.

4. A low noise parametric amplifier comprising an electron gun for forming and projecting a beam of electrons, said beam being characterized by fast and slow modes of propagation and upper sideband frequency noise energy thereon, a source of signal frequency energy, a source of pump frequency energy, transmitting means extending along said beam for periodically with respect to distance introducing to and exacting from the fast mode of said beam said signal energy and for periodically extracting from and introducing to the fast mode of said beam said upper sideband noise energy, the transferrals of said signal energy and said upper sideband frequency noise energy between the beam and said transmitting means being substantially 180 degrees out-of-phase with respect to distance whereby substantially all of said upper sideband noise energy exists on said beam at a position at which substantially all of said signal energy exists on said transmitting means, said transmitting means further comprising means for modulating said beam in the fast mode with pump energy, means including said beam for causing parametric amplification of said signal energy through the mixing of said signal energy with said pump energy, and means located at a position at which substantially all of said signal energy exists on said transmitting means and substantially all of said upper sideband frequency noise energy exists on said beam for extracting said signal energy from said transmitting means.

References Cited in the file of this patent

UNITED STATES PATENTS

| | | |
|---|---|---|
| 2,584,597 | Landauer | Feb. 5, 1952 |
| 2,657,305 | Knol et al. | Oct. 27, 1953 |
| 2,958,001 | Ashkin et al. | Oct. 25, 1960 |

OTHER REFERENCES

Article by P. K. Tien et al., pages 700–706, Proc. I.R.E. for April 1958.

Article by R. Adler et al., pages 1756–1757, Proc. I.R.E. for October 1958.

Article by D. C. Forster and M. R. Currie, "Experiments on Space-Charge-Pumped, Longitudinal, Beam Type Parametric Amplifiers," June 1959, Research Report III, Research Laboratories, Hughes Aircraft Co., Culver City, Calif., pages 1–27.